US009000925B2

(12) United States Patent
Forster

(10) Patent No.: US 9,000,925 B2
(45) Date of Patent: Apr. 7, 2015

(54) RFID TAG WITH A RELEASABLE COUPLER

(75) Inventor: Ian James Forster, Chelmsford (GB)

(73) Assignee: Avery Dennison Corporation, Glendale, CA (US)

( * ) Notice: Subject to any disclaimer, the term of this patent is extended or adjusted under 35 U.S.C. 154(b) by 274 days.

(21) Appl. No.: 12/033,428

(22) Filed: Feb. 19, 2008

(65) Prior Publication Data

US 2009/0206995 A1    Aug. 20, 2009

(51) Int. Cl.
*G08B 13/14* (2006.01)
*G06K 19/077* (2006.01)
*G06K 19/07* (2006.01)

(52) U.S. Cl.
CPC ...... *G06K 19/07749* (2013.01); *G06K 19/0726* (2013.01)

(58) Field of Classification Search
USPC .............. 340/500, 540, 568.1, 572.1–572.9, 340/10.1–10.6; 235/375–385
See application file for complete search history.

(56) References Cited

U.S. PATENT DOCUMENTS

| 4,673,923 | A | | 6/1987 | Boscoe et al. |
| 4,863,772 | A | | 9/1989 | Cross |
| 5,491,483 | A | * | 2/1996 | D'Hont .......................... 342/42 |
| 5,647,107 | A | * | 7/1997 | Brewster ...................... 24/713.6 |
| 6,019,865 | A | | 2/2000 | Palmer et al. |
| 6,451,154 | B1 | | 9/2002 | Grabau et al. |
| 6,787,208 | B2 | | 9/2004 | Galovic |
| 6,927,738 | B2 | | 8/2005 | Senba et al. |
| 6,940,408 | B2 | | 9/2005 | Ferguson et al. |
| 6,951,596 | B2 | | 10/2005 | Green et al. |
| 7,170,415 | B2 | | 1/2007 | Forster |
| 7,209,042 | B2 | * | 4/2007 | Martin et al. .............. 340/572.8 |
| 7,361,251 | B2 | | 4/2008 | Green et al. |
| 7,368,032 | B2 | | 5/2008 | Green et al. |
| 7,633,394 | B2 | | 12/2009 | Forster |
| 2003/0075608 | A1 | | 4/2003 | Atherton |

(Continued)

FOREIGN PATENT DOCUMENTS

| EP | 1 262 932 | 12/2002 |
| EP | 1262932 A1 * | 12/2002 |

(Continued)

OTHER PUBLICATIONS

International Search Report and Written Opinion issued in corresponding PCT/US2005/042955 dated Apr. 19, 2006.

(Continued)

*Primary Examiner* — James Yang
(74) *Attorney, Agent, or Firm* — Avery Dennison Retail Information Services LLC

(57) ABSTRACT

A radio-frequency identification (RFID) tag is provided that comprises an RFID transceiver configured to transmit and receive radio frequency (RF) signals, the RFID transceiver comprising an integrated circuit chip (IC) coupled to an antenna having an impedance, gain and directionality that in conjunction with the characteristics of the IC defines a first read range of the RFID tag. The RFID tag also comprises a releasable coupler configured to be releasably engagable with the RFID transceiver comprising a coupling material, the releasable coupler being configured such that when the releasable coupler is releasably engaged with the RFID transceiver, the coupling material altering at least one of the impedance, the gain and the directionality of the antenna to define a second read range of the RFID tag, wherein the second read range is greater than the first read range.

21 Claims, 10 Drawing Sheets

(56) References Cited

U.S. PATENT DOCUMENTS

| | | |
|---|---|---|
| 2003/0080917 A1 | 5/2003 | Adams et al. |
| 2003/0116634 A1* | 6/2003 | Tanaka .................. 235/492 |
| 2003/0136503 A1 | 7/2003 | Green et al. |
| 2003/0156032 A1 | 8/2003 | Adams et al. |
| 2003/0169153 A1 | 9/2003 | Muller |
| 2004/0119593 A1 | 6/2004 | Kuhns |
| 2006/0012481 A1* | 1/2006 | Rajapakse et al. ......... 340/572.1 |
| 2006/0125641 A1 | 6/2006 | Forster |
| 2006/0145841 A1 | 7/2006 | Daurensan et al. |
| 2007/0171081 A1 | 7/2007 | Dixon et al. |
| 2009/0108993 A1 | 4/2009 | Forster |
| 2009/0184824 A1 | 7/2009 | Forster |
| 2009/0206995 A1 | 8/2009 | Forster |

FOREIGN PATENT DOCUMENTS

| | | |
|---|---|---|
| EP | 1 132 859 | 1/2006 |
| FR | 2 784 083 | 4/2000 |
| WO | 00/21026 | 4/2000 |
| WO | 01/73685 | 10/2001 |
| WO | 2006/060324 | 6/2006 |
| WO | 2009/094283 | 7/2009 |
| WO | 2009/105370 | 8/2009 |

OTHER PUBLICATIONS

Office Action issued in corresponding European Patent Application No. 05 825 721 dated Oct. 29, 2008.

Patent Abstracts of Japan, vol. 1999, No. 05, May 31, 1999 & JP 11-053656, Feb. 26, 1999, abstract.

International Search Report and Written Opinion issued in corresponding PCT/US2009/033756 dated May 8, 2009.

International Preliminary Report on Patentability issued in corresponding PCT/US2005/042955 dated Apr. 18, 2008.

Office Action issued in corresponding EP 05 825 721 dated Feb. 12, 2010.

International Preliminary Report on Patentability issued in corresponding IA No. PCT/US2009/31051 dated Apr. 16, 2010.

International Search Report and Written Opinion issued in corresponding IA No. PCT/US2009/31051 dated Apr. 17, 2009.

International preliminary report on patentability issued in corresponding International application PCT/US2009/033756 dated May 20, 2010.

Reply to International search report and written opinion issued in corresponding International application PCT/US2009/033756 on Jul. 7, 2009.

Office action issued in related U.S. Appl. No. 12/017,778 dated Jan. 6, 2011.

Office action issued in related U.S. Appl. No. 12/017,778 dated Aug. 25, 2010.

Office action issued in related U.S. Appl. No. 12/017,778 dated Jan. 20, 2010.

Office action issued in related U.S. Appl. No. 12/017,778 dated May 27, 2011.

* cited by examiner

RFID TAG WITH A RELEASABLE COUPLER

TECHNICAL FIELD

The present invention relates to a radio-frequency identification (RFID) tag, and in particular to an RFID tag with a releasable coupler.

BACKGROUND OF THE INVENTION

Automatic identification is the broad term applying to a host of technologies that are used to help machines identify objects. Automatic identification is often coupled with automatic data capture. Therefore, companies wanting to identify items are able to capture information about the items, to store the captured information in a computer, and to selectively retrieve the information from the computer for a variety of useful purposes, all with minimal human labor.

One type of automatic identification technology is radio-frequency identification (RFID). RFID is a term that describes technologies that use radio waves to automatically identify objects. There are several conventional methods of identifying objects using RFID, the most common of which is to store a serial number that identifies a product (and other information, if desired) on a microchip that is attached to an antenna. The chip and the antenna together define an RFID transceiver. The antenna enables a remote reader (e.g., an RFID reader) that has a transceiver to communicate with the chip, and enables the chip to transmit identification information back to the reader when actuated to do so (e.g., interrogated) by the reader. The RFID reader converts the radio waves returned from the RFID tag into a form that can then be utilized by a computer.

BRIEF SUMMARY OF THE INVENTION

One aspect of the invention is related to a radio-frequency identification (RFID) tag comprising an RFID transceiver configured to transmit and receive radio frequency (RF) signals, the RFID transceiver comprising an integrated circuit (IC) coupled to an antenna having an impedance, gain and directionality that, in conjunction with the characteristics of the IC defines a first read range of the RFID tag. The RFID tag also comprises a releasable coupler configured to be releasably engagable with the RFID transceiver comprising a coupling material, the releasable coupler being configured such that when the releasable coupler is releasably engaged with the RFID transceiver, the coupling material altering at least one of the impedance, gain and directionality of the antenna to define a second read range of the RFID tag, wherein the second read range is greater than the first read range.

Another aspect of the invention is related to an RFID tag comprising an RFID transceiver configured to transmit and receive RF signals, the RFID transceiver comprising an IC chip and an antenna comprising a plurality of segments, wherein the plurality of segments are spaced apart from each other, and at least one of the plurality of segments is coupled to the IC chip to provide a first read range for the RFID tag. The RFID tag also comprises a releasable coupler configured to be releasably engagable with the RFID transceiver comprising a coupling material, the releasable coupler being configured such that when the releasable coupler is releasably engaged with the RFID transceiver, the coupling material couples at least two of the plurality of antenna segments together to provide a second read range for the RFID tag, wherein the second read range is greater than the first read range.

Yet another aspect of the invention is related to a method for altering a read range of an RFID tag comprising providing the RFID tag in an engaged state that comprises an RFID transceiver that can provide RF signals in response to interrogation signals. The RFID tag also comprises a releasable coupler engaged with the RFID transceiver to define a first read range for the RFID tag. The method also comprises transitioning the RFID tag to a disengaged state with a second read range that is substantially less than the first read range by disengaging the releasable coupler from the RFID transceiver.

DETAILED DESCRIPTION OF THE INVENTION

Radio Frequency Identification (RFID) tags are used in a wide range of application environments. A typical RFID tag can include an RFID integrated circuit chip and antenna that is mounted on a substrate. Engaging and disengaging certain structures to the RFID tag can change certain properties of the antenna (e.g., the impedance of the antenna relative to the RFID integrated circuit chip, the gain of the antenna, the directionality of the antenna, etc.) which can alter the read range of the RFID tag.

Figure 1:
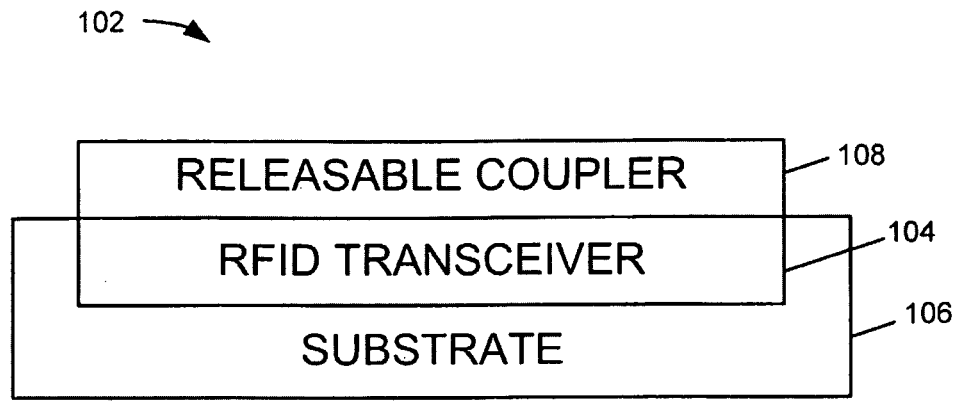
FIG. 1 illustrates a block diagram of an RFID tag according to an aspect of the invention.

FIG. 1 illustrates a block diagram of an RFID tag 102 in accordance with an aspect of the invention. As used herein, the terms "tag" and "RFID tag" refer to an information medium that includes identifying and/or other information in an RFID device. The RFID tag 102 includes an RFID transceiver 104 that can transmit and receive a radio frequency (RF) signal. The transmitted RF signal can be sent in response to an interrogation signal sent by an RFID reader. The transmitted RF signal can provide, for example, identification information (e.g., a serial number or identification number) to the RFID reader. As an example, the RFID transceiver 104 can be designed to transmit and receive RF signals at a frequency of about 865 MHz to about 868 MHz or about 902 MHz to about 928 MHz, although one skilled in the art will appreciate that other frequencies could be employed.

The RFID transceiver 104 includes an RFID integrated circuit (IC) chip (hereinafter, "RFID chip") that can process RF signals. The RFID chip can supply the RF signal, for example, in response to receiving, an incoming interrogation signal (e.g., an actuation signal) transmitted by an external system, such as an inventory system that includes an RFID reader. The RFID transceiver 104 can also include an antenna to receive and transmit the RF signals. In some implementations, at least a portion of the antenna can be permanently electrically coupled to the RFID chip. In other implementations, the antenna could be spaced apart from the RFID chip, such that a coupling material is required to couple the antenna to the RFID chip.

The RFID transceiver 104 could be mounted, for example, on a substrate 106 (e.g., a facestock). The substrate 106 could be formed, for example, with paper or plastic, as is known in the art. Additionally, the RFID tag 102 can include a releasable coupler 108. The releasable coupler 108 can be releasably engagable with the substrate 106 and/or the RFID transceiver 104. When the releasable coupler 108 is engaged to the substrate 106 and/or the RFID transceiver 104 (hereinafter referred to as an "engaged state"), the releasable coupler 108 increases the read range of the RFID tag 102 to a maximum read range (e.g., about 8 meters). It is to be understood that the term "read range" refers to both the range at which the RFID tag 102 can coherently receive interrogation signals transmitted from an external source (e.g., an RFID reader), as well as the range at which the external system can coherently receive a returned signal propagated from the RFID tag 102. In some implementations, the releasable coupler 108 can be disengaged from the substrate 106 and/or the RFID transceiver 104 by an end-user of the RFID tag 102 to substantially reduce the read range of the RFID tag 102, for example to about 15 centimeters. In other implementations, the RFID tag 102 can be configured such that when the releasable coupler 108 is disengaged from the substrate 106 and/or the RFID transceiver 104 (hereinafter referred to as a "disengaged state"), the far field read range of the RFID tag 102 can be substantially eliminated (e.g., less than 300 centimeters).

As an example, the releasable coupler 108 can include a section of coupling material. The coupling material could be implemented, for example, as a conductive material, such as conductive ink. In such an implementation, the conductive ink could be applied, for example with a printer with a ribbon or an ink-jet printer. Alternatively, the coupling material could be formed as a thin section of conductive metal (e.g., gold, copper or aluminum). In other implementations, the coupling material could be a vapor phase deposited metal. The choice of the particular coupling material can be based, for example, on the method of manufacturing the RFID tag 102 and/or the materials chosen for the substrate 106. The interaction of the coupling material with the RFID transceiver 104 is dependent on the design and construction of the RFID tag 102; however, in general, for a simple antenna such as a half wave dipole, the coupling material modifies the impedance of the antenna and hence alters the matching between the antenna and the RFID chip. As one example, the coupling material can electrically couple antenna segments (e.g., discrete sections) together, thereby changing the impedance of the antenna relative to the RFID chip. Such a change in the impedance can increase the read range of the RFID tag 102.

Moreover, when the releasable coupler 108 is disengaged (e.g., removed) from the substrate 106 and/or the RFID transceiver 104, the RFID tag 102 is transitioned to the disengaged state. In the disengaged state, the coupling material no longer engages one or more of the antenna segments. Accordingly, the antenna segments electrically coupled by the coupling material are electrically decoupled in the disengaged state. As discussed above, the interaction of the coupling material with the RFID transceiver 104 is dependent on the design and construction of the RFID tag 102; however, in general, for a simple antenna such as a half wave dipole, the disengagement of the coupling material modifies the impedance of the antenna and hence alters the matching between the antenna and the RFID chip. For instance, such a decoupling could be configured to change the impedance of the antenna relative to the RFID chip, thereby substantially reducing (or even eliminating) the read range of the RFID tag 102.

In another example, the engaging and disengaging of the coupling material could modify a gain and/or directionality associated with the antenna. For instance, the RFID tag 102 could be configured such that when the RFID tag 102 is in the engaged state, the coupling material can alter a radiation pattern of the antenna. Alteration of the radiation pattern could, for example, increase the sensitivity of the RFID tag 102 in certain directions, thereby altering an RFID read range in a given configuration of an RFID reader system and the RFID tag 102. Conversely, in such a configuration, when the RFID tag 102 is transitioned to the disengaged state, the radiation pattern of the antenna can be altered again, for example, to decrease the sensitivity of the antenna in certain directions, thereby altering the read range in the given configuration of the RFID reader system and the RFID tag 102. Moreover, a combination of the impedance, the gain and the directionality of the antenna could be adjusted to achieve specific characteristics (e.g., fine tuning) for the RFID tag 102.

The releasable coupler 108 can be releasably engaged to the substrate 106 and/or the RFID chip in a multitude of configurations. As one example, the releasable coupler 108 could be secured to the substrate 106 through an adhesive material (e.g., a non-curing pressure sensitive adhesive). Alternatively, the releasable coupler 108 could be engaged to the substrate 106 with a mechanical locking mechanism that could, for instance, require a specially designed tool for disengagement. As yet another example, the releasable coupler 108 could be formed as an integrated unit with the substrate 106, such that the releasable coupler 108 can be disengaged by tearing (e.g., via perforations, slits, score lines or the like) one or more portions or all of the releasable coupler 108 away from the substrate 106. In another configuration, the releasable coupler 108 could be attached, for example, with one or more magnets, or the releasable coupler 108 could be configured to incorporate a mechanical lock controlled by magnets, such that when either magnetic fields securing the releasable coupler 108 are altered by an external device, or the magnets are de-magnetized using a suitable alternating magnetic field from an external device, the releasable coupler 108 can be detached. In other configurations, the releasable coupler 108 could be part of an electronic article surveillance (EAS) device that can be removed or disabled at the point of sale, and removal or disabling of the releasable coupler 108 can alter the read range of the RFID tag 102.

One skilled in the art will appreciate that for certain application environments, it may be desirable to substantially reduce (or even eliminate) the read range of the RFID tag 102. For example, in retail applications, a reader system (that includes an RFID reader) can be positioned at a store exit (e.g., a security system). The reader system detects and reads RFID tags that pass near the reader system. When ownership of an item with an attached RFID tag 102 is transferred (e.g., when the item is purchased or otherwise permissibly removed from inventory), it is often undesirable for the associated RFID tag 102 to be read by the reader system. However, it may be desirable that the read range of the RFID tag 102 is not eliminated entirely to facilitate, for example, returning the purchased item. In such a situation, a short read range (e.g., 15 centimeters) would only allow an RFID tag 102 that is in very close proximity with an RFID reader to be interrogated.

Moreover, in some implementations, after some or all of the portions of the releasable coupler 108 has been removed, it may be desirable to restore the read range of the RFID tag 102 to its maximum (or near maximum). For instance, in the above discussed retail environment, if the item associated with an RFID tag 102 is returned to the retail store, it may be desirable to restore the RFID tag 102 to its maximum (or near maximum) read range. Such a restoration can be achieved, for example, by manually or mechanically re-engaging the same or a different releasable coupler 108 to the substrate 106 and/or the RFID transceiver 104 in a releasably engagable manner, thereby returning the RFID tag 102 to the engaged state. Alternatively, a return coupler (not shown) can be releasably engaged to the substrate 106 and/or the RFID transceiver 104, thereby transitioning the RFID tag 102 to a "restored state." In another example, the RFID tag 102 could be employed in a home or business delivery service where a product with the RFID tag 102 attached to the product, is delivered by a postal or courier service. In such a configuration, the releasable coupler 108 could be removed, for example, by the courier when the product is delivered and retained as proof of delivery. Additionally, the releasable coupler 108 may carry printed information such as a number or bar code. The printed information could be employed, for example, if the customer (to whom product is delivered) wishes to return an item. In such an implementation, the customer could be sent a return coupler that can be attached to the RFID tag 102 to re-enable long read range to facilitate handling a re-stocking of the returned item by the retailer, thereby transitioning the RFID tag 102 to the restored state. Additionally or alternatively, a customer that returns a large quantity of goods may have labels incorporating the coupler to re-enable the long range reading of the RFID tag 102 and be able to print return couplers on demand.

The return coupler can be configured such that when the return coupler is engaged with the substrate 106 and/or the RFID transceiver 104, the RFID tag 102 operates in a manner similar to the engaged state. The return coupler can be implemented, for example, as a conductive tape or pressure sensitive material to engage a portion of the antenna in the RFID transceiver 104 to electrically couple antenna segments together. Alternatively, the return coupler could be implemented as a pre-formed label or pressure sensitive system so as to assist the end user in transitioning the RFID tag 102 to the restored state. As yet another alternative, the return coupler could be implemented as conductive ink that could be applied, for example, with a marker, pen, highlighter type instrument, wax crayon or the like. Printed indicia can be provided on the substrate to facilitate attachment and/or application of the return coupler. One skilled in the art will appreciate that other implementations are possible as well.

Figure 2:
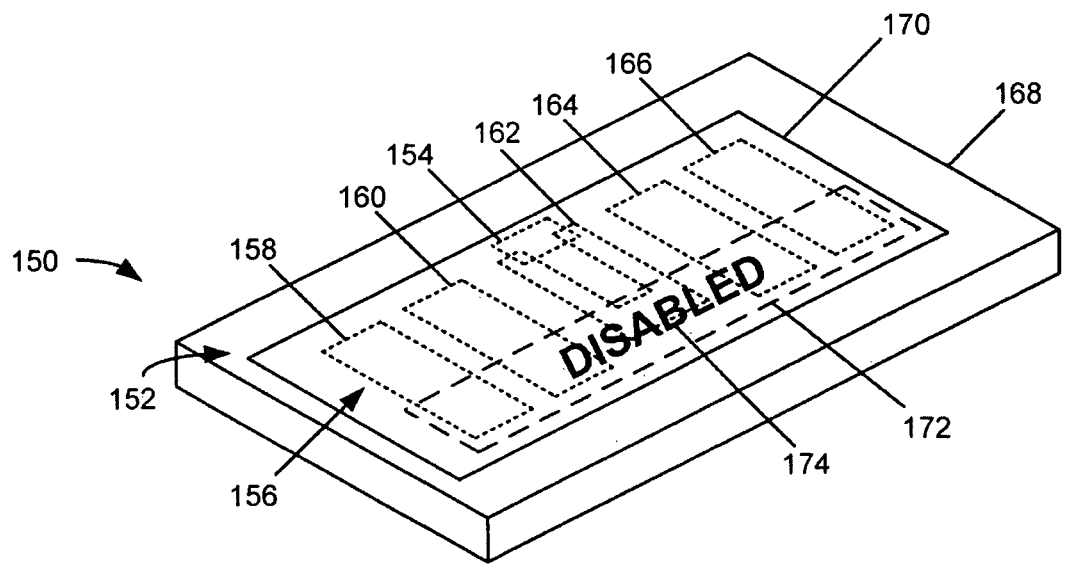
FIG. 2 illustrates a perspective view of an RFID tag in accordance with an aspect of the invention.

FIG. 2 illustrates a perspective view of an RFID tag 150 in accordance with an aspect of the invention. The RFID tag 150 is illustrated in an engaged state. In FIG. 2, different line patterns are employed to indicate different planes. As an example, the RFID tag 150 can have a substantially rectangular shape. The RFID tag 150 can include an RFID transceiver 152 that includes an RFID chip 154 for providing identification information to an associated antenna 156. The antenna 156 can transmit an RF signal that provides the identification information to an external system, such as an RFID reader in response to receiving an interrogation signal from the RFID reader. The antenna 156 can include a plurality of antenna segments 158-166 (e.g., discrete sections). It is to be understood that while the antenna segments 158-166 are illustrated as having a rectangular shape, other geometric configurations are possible. For example, the antenna segments could form a bar code, or be letters or other characters forming a word; the word, which becomes visible after the releasable coupler is disengaged, which could be indicative of the status of the RFID tag 150, such as 'OFF', 'DISABLED', 'KILLED', 'SECURE' or 'PRIVATE'. In the present example, only one of the antenna segments 162 is electrically coupled to the RFID chip 154 when the RFID tag 150 is in a disengaged state. The RFID transceiver 152 can be mounted on a substrate 168, which could be formed, for example, with paper or plastic.

The RFID tag 150 can include a releasable coupler 170 that can be releasably engagable with the substrate 168 and/or the RFID transceiver 152. The releasable coupler 170 includes a section of coupling material 172, which could be implemented as a conductive material, as discussed above. The releasable coupler 170 could be formed with a similar material as the substrate 168 (e.g., paper or plastic) or a different material. The releasable coupler 170, when engaged with the substrate 168, electrically couples the antenna segments 158-166 together (via the coupling material 172). Such electrical coupling of the antenna segments 158-166 increases a read range of the RFID tag 150 to a maximum (or near maximum) read range. The releasable coupler 170 could be disengaged from the substrate 168, for example by an end-user of the RFID tag 150. Once the releasable coupler 170 is disengaged, the read range of the RFID tag 150 is substantially reduced. Additionally, indicia 174 (shown as text "DISABLED") can be printed on the RFID tag 150 in a section of the RFID tag 150 covered by the releasable coupler 170 when the RFID tag 150 is in the engaged state. However, when the releasable coupler 170 is removed, thereby transitioning the RFID tag 150 to the disengaged state, the indicia 174 is revealed to an end user of the RFID tag 150 to notify the end user that the RFID tag 150 is in the disengaged state.

Figure 3:
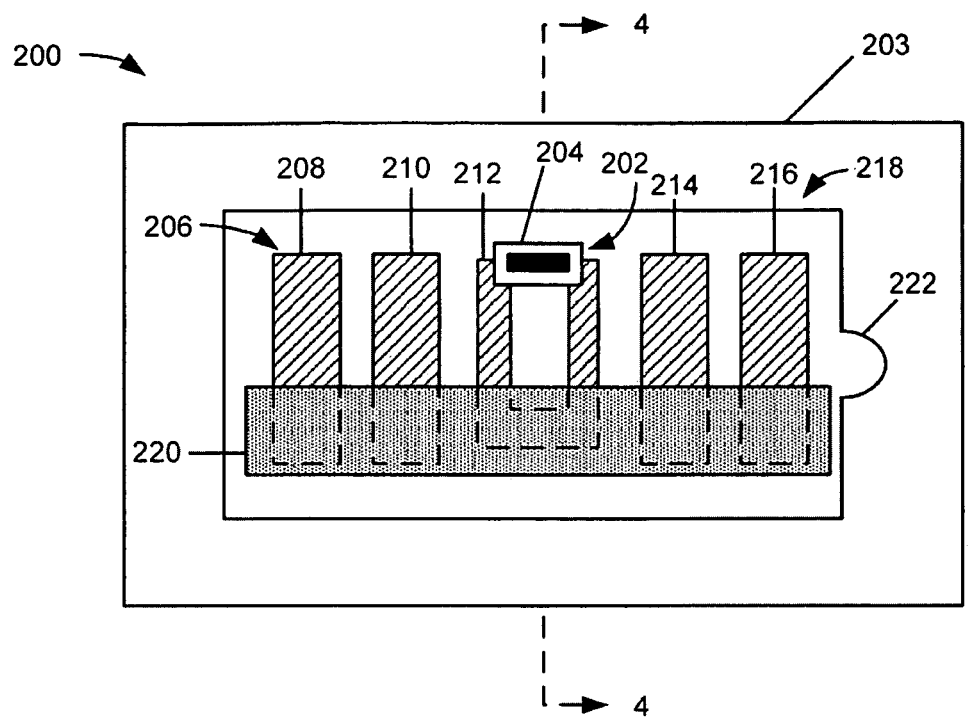
FIG. 3 illustrates another block diagram of an RFID tag according to an aspect of the invention.
Figure 4:
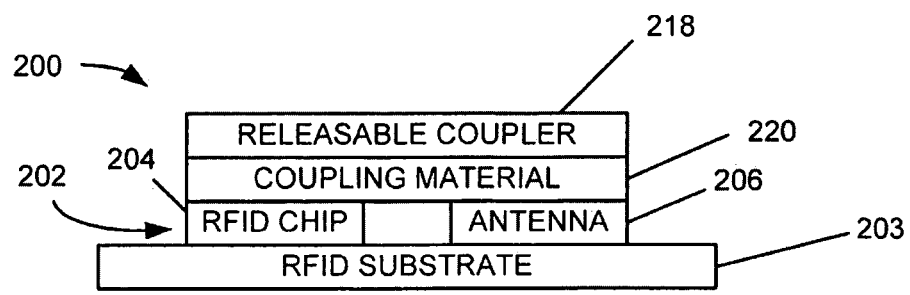
FIG. 4 illustrates a cross section of the RFID tag of FIG. 3 taken along line 4-4 thereof.

FIG. 3 illustrates another example of an RFID tag 200 in accordance with an aspect of the invention. The RFID tag 200 is illustrated in an engaged state. FIG. 4 illustrates a cross-sectional view of the RFID tag 200 illustrated in FIG. 3 taken along line 4-4 thereof. For purposes of simplification of explanation, the same reference numbers have been used in both FIGS. 3 and 4. The RFID tag 200 includes an RFID transceiver 202 that can be mounted onto a substrate 203. The RFID transceiver can include, for example, an RFID chip 204 and an associated antenna 206. The associated antenna 206 includes a plurality of antenna segments 208-216 (e.g., discrete sections). In the present example, a single antenna segment 212 (of the plurality of antenna segments 208-216) is permanently electrically coupled to the RFID chip 204; although those skilled in the art will appreciate that more antenna segments 208-216 could be permanently electrically coupled to the RFID chip 204 as well.

The RFID tag 200 also includes a releasable coupler 218 that can be releasably engaged to the substrate 203. The releasably engagable coupler could be releasably secured to the substrate 203 with an adhesive material (e.g., a non-curing pressure sensitive adhesive, repositionable or removable adhesives). The releasable coupler 218 can include a section of coupling material 220 that can electrically couple the antenna segments 208-216 of the RFID transceiver 202 together. As one example, when the antenna segments 208-216 of the RFID transceiver 202 are electrically coupled together, the impedance of the antenna 206 is changed relative to the impedance of the RFID chip 204, thereby increasing the read range of the RFID tag 200. Additionally or alternatively, coupling the antenna segments 208-216 together could change the gain and/or directionality of the antenna 206. The releasable coupler 218 can include a pull tab section 222 that can be manually pulled by an end user to disengage one or more or all of the portions of the releasable coupler 218 from the substrate 203 to transition the RFID tag 200 to a disengaged state.

Figure 5:
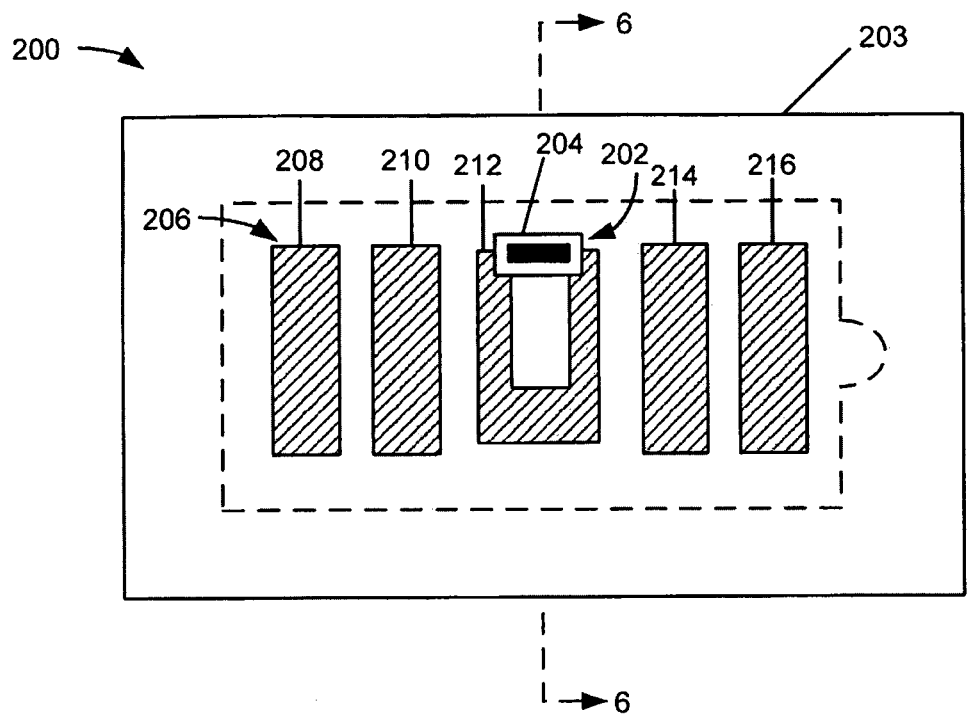
FIG. 5 illustrates a block diagram of the RFID tag illustrated in FIG. 3 according to an aspect of the invention.
Figure 6:
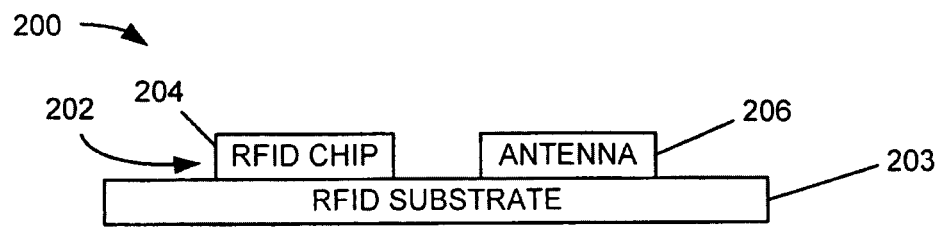
FIG. 6 illustrates a cross section of the RFID tag of FIG. 5 taken along line 6-6 thereof.

FIG. 5 illustrates the RFID tag 200 illustrated in FIGS. 3 and 4 in the disengaged state. FIG. 6 illustrates a cross-sectional view of the RFID tag 200 illustrated in FIG. 5 taken along line 6-6 thereof. For purposes of simplification of explanation, the same reference numbers have been used in FIGS. 3-6 to indicate the same structure. As discussed above, it may become desirable to transition the RFID tag 200 to the disengaged state if ownership of an item associated with the RFID tag 200 is transferred (e.g., purchased). In the disengaged state, the coupling material 220 (removed, and thus not shown) does not electrically couple the antenna segments 208-216 together. Accordingly, in the disengaged state, only one of the antenna segments 212 is electrically coupled to the RFID chip 204, thereby substantially reducing the read range of the RFID tag 200. Typically, the reduced read range is desirable so that the RFID tag 200 is not detected by any reader system that is not in very close proximity to the RFID tag 200.

Figure 7:
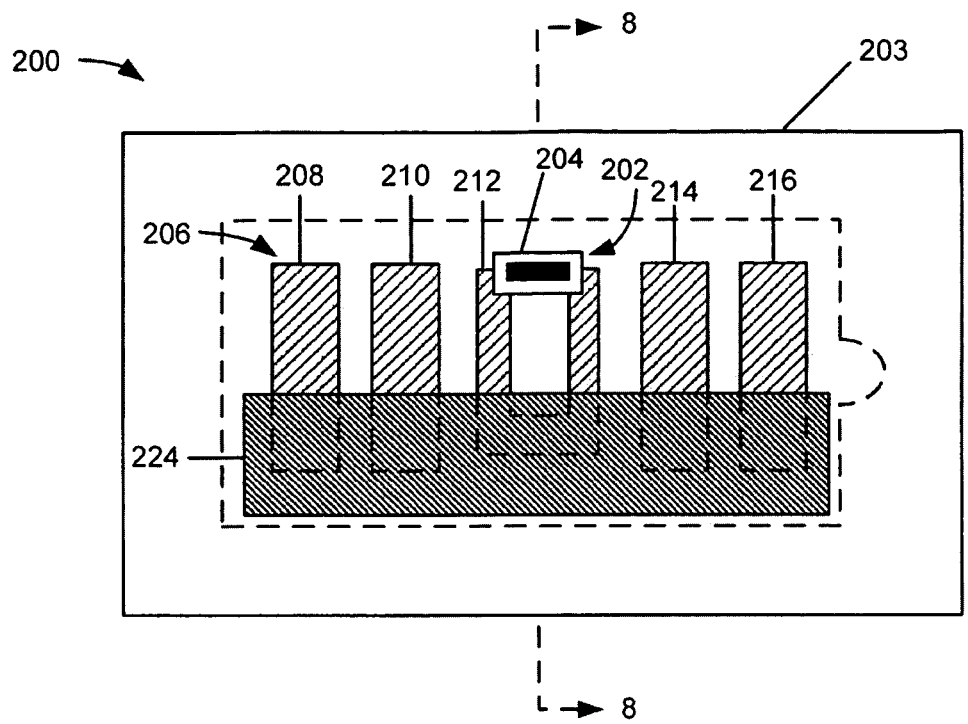
FIG. 7 illustrates a block diagram of the RFID tag illustrated in FIG. 6 according to an aspect of the invention.
Figure 8:
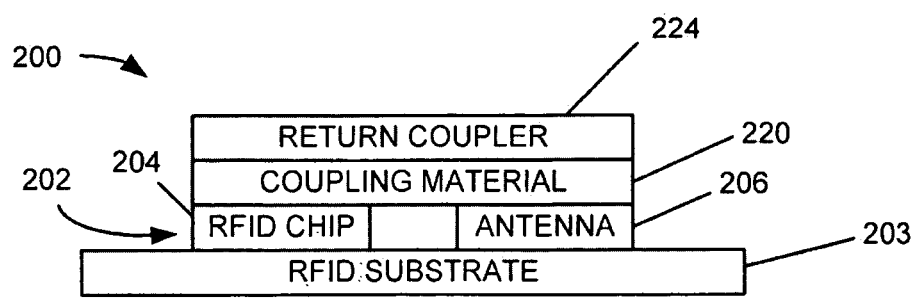
FIG. 8 illustrates a cross section of the RFID tag of FIG. 5 taken along line 8-8 thereof.

FIG. 7 illustrates the RFID tag 200 illustrated in FIGS. 5 and 6 in a restored state. FIG. 8 illustrates a cross-sectional view of the RFID tag 200 illustrated in FIG. 7 taken along line 8-8 thereof. For purposes of simplification of explanation, the same reference numbers have been used in FIGS. 3-8 to indicate the same structure. As discussed above, it may become desirable to transition the RFID tag 200 to the restored state if ownership of an item associated with the RFID tag 200 is transferred a second time (e.g., item returned).

To transition the RFID tag 200 to the restored state, a return coupler 224 can be releasably engaged with the substrate 203 and/or the RFID transceiver 202. The return coupler 224 can electrically couple the antenna segments 208-216 together. In the RFID tag 200 illustrated, the return coupler 224 overlays a portion of the antenna segments 208-216 of the RFID transceiver 202. The return coupler 224, once releasably engaged with the RFID transceiver 202, restores the read range of the RFID tag 200 to about the read range in the engaged state.

The return coupler 224 can be composed of a conductive tape. In such a situation, an end-user applying the return coupler 224 can lay the conductive tape across the RFID transceiver 202. Alternatively, the return coupler 224 could be composed as a pre-formed label with a conductive adhesive. In some implementations, guidelines could be printed on the RFID transceiver 202 to assist the end-user in applying the return coupler 224.

Figure 9:
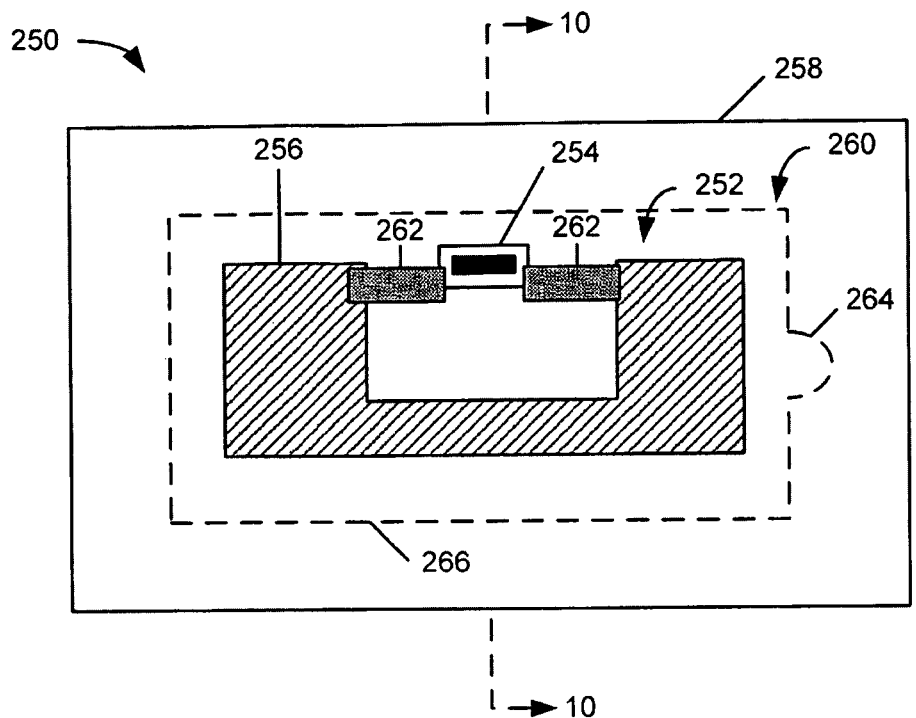
FIG. 9 illustrates another block diagram of an RFID tag according to an aspect of the invention.
Figure 10:
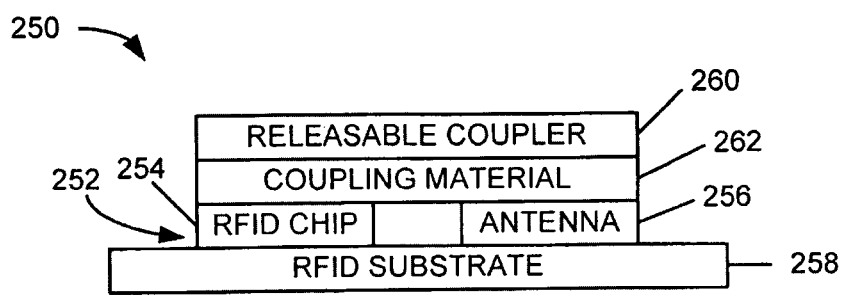
FIG. 10 illustrates a cross section of the RFID tag of FIG. 9 taken along line 9-9 thereof.

FIG. 9 illustrates yet another example of an RFID tag 250 in accordance with an aspect of the invention. The RFID tag 250 is illustrated in an engaged state. FIG. 10 illustrates a cross-sectional view of the RFID tag 250 illustrated in FIG. 9 taken along line 10-10 thereof. For purposes of simplification of explanation, the same reference numbers have been used in both FIGS. 9 and 10 to indicate the same structure. The RFID tag 250 includes an RFID transceiver 252 with an RFID chip 254 and an associated antenna 256 that is not permanently electrically coupled to the RFID chip 254. The RFID transceiver can be mounted onto a substrate 258.

The RFID tag 250 also includes a releasable coupler 260 that can be releasably engaged with the substrate 258. The releasable coupler 260 could be releasably engaged to the substrate 258 with an adhesive material (e.g., a non-curing pressure sensitive adhesive, repositionable, removable adhesives). The releasable coupler 260 can include one or more detachable or removable sections of coupling material 262 that can electrically couple the antenna 256 to the RFID chip 254. In the present example, two sections of coupling material 262 are illustrated, but one skilled in the art will appreciate that in other implementations, more or less sections of coupling material 262 could be employed. As one example, when the antenna 256 of the RFID transceiver is coupled to the RFID chip 254, the impedance of the antenna 256 is changed relative to the impedance of the RFID chip 254, thereby increasing the read range of the RFID tag 250. Additionally or alternatively, coupling the antenna 256 to the RFID chip 254 could change the gain and/or directionality of the RFID tag 250. The releasable coupler 260 can include a pull tab section 264 or other indicia showing an area of weakness or reduced adhesion that can be manually pulled by an end user to disengage the releasable coupler 260 from the RFID substrate 258 to transition the RFID tag 250 to a disengaged state. A dashed line pattern depicted at 266 can indicate a possible configuration of perforations in the RFID tag 250 that can facilitate removal of the releasable coupler 260 by the end user. One skilled in the art will appreciate the variety of configurations that could be employed to facilitate removal of the releasable coupler 260.

Figure 11:
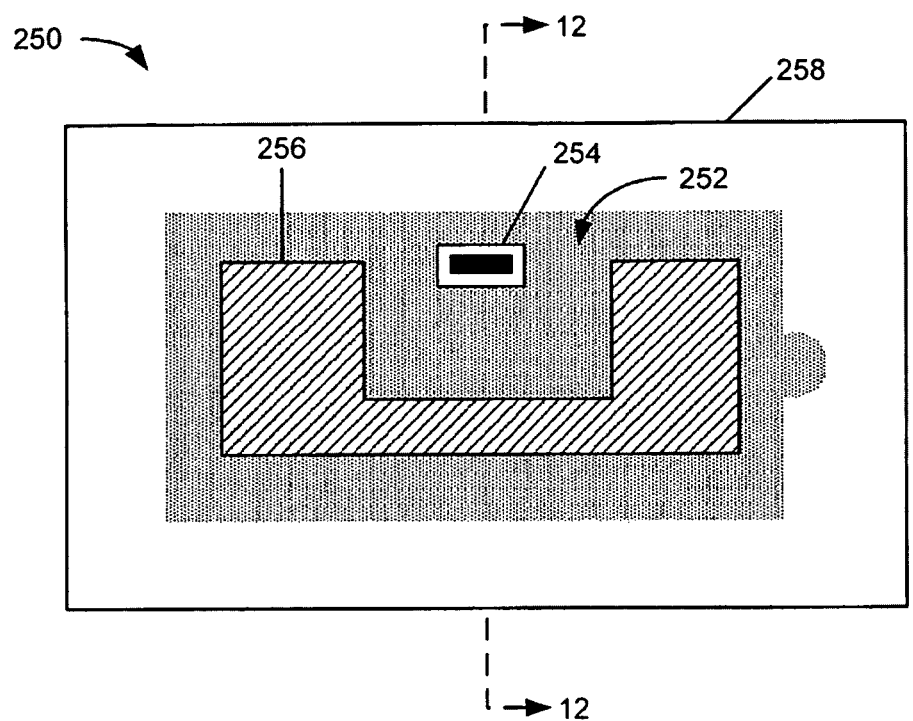
FIG. 11 illustrates a block diagram of the RFID tag illustrated in FIG. 9 according to an aspect of the invention.
Figure 12:
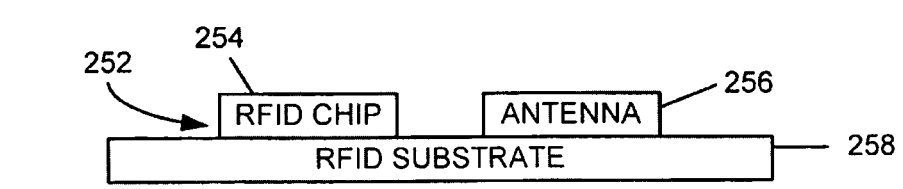
FIG. 12 illustrates a cross section of the RFID tag of FIG. 11 taken along line 12-12 thereof.

FIG. 11 illustrates the RFID tag 250 illustrated in FIGS. 9 and 10 in the disengaged state. FIG. 12 illustrates a cross-sectional view of the RFID tag 250 illustrated in FIG. 11 taken along line 12-12 thereof. For purposes of simplification of explanation, the same reference numbers have been used in FIGS. 9-12 to indicate the same structure. As discussed above, it may become desirable to transition the RFID tag 250 to the disengaged state if ownership of an item associated with the RFID tag 250 is transferred (e.g., item purchased). In the disengaged state, the coupling material 262 (removed, and thus not shown) does not couple the antenna 256 to the RFID chip 254. Accordingly, in the disengaged state, the read range of the RFID tag 250 is reduced to almost zero (e.g., eliminated). Typically, the eliminated read range is desirable so that the RFID tag 250 is not detected by any reader system.

Figure 13:
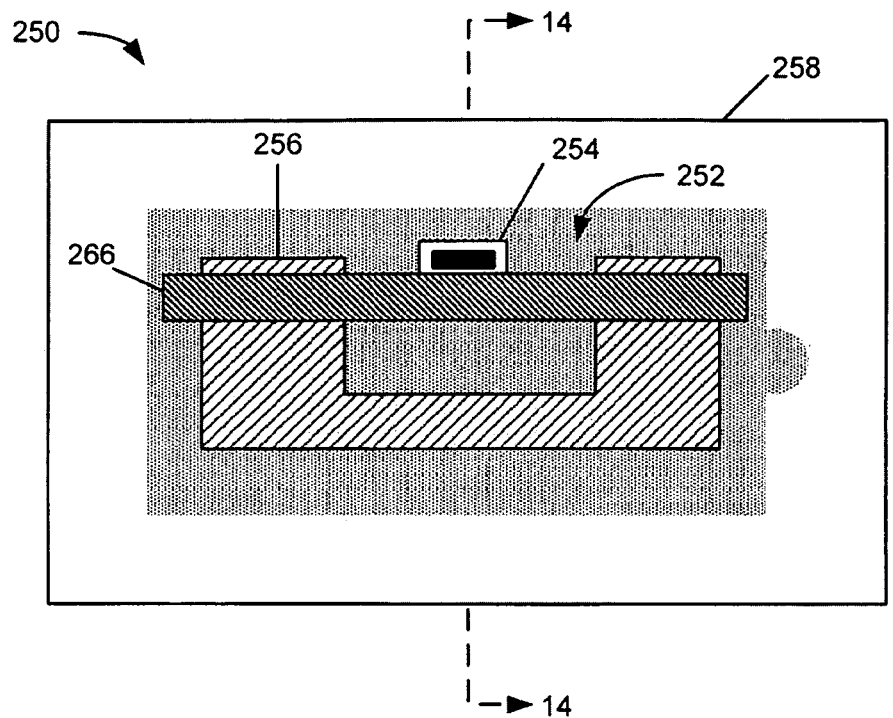
FIG. 13 illustrates a block diagram of the RFID tag illustrated in FIG. 11 according to an aspect of the invention.
Figure 14:
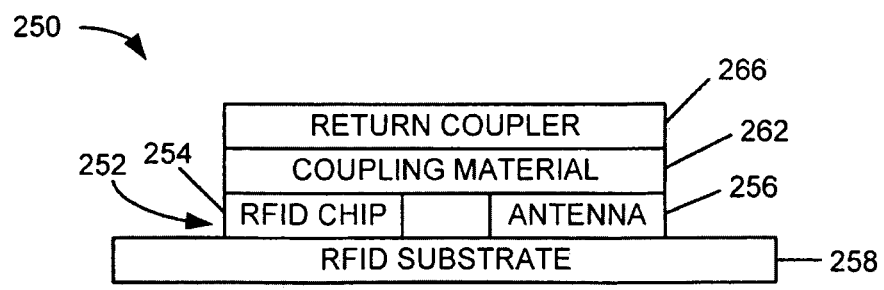
FIG. 14 illustrates a cross section of the RFID tag of FIG. 13 taken along line 14-14 thereof.

FIG. 13 illustrates the RFID tag 250 illustrated in FIGS. 9-12 in a restored state. FIG. 14 illustrates a cross-sectional view of the RFID tag 250 illustrated in FIG. 13 taken along line 14-14 thereof. For purposes of simplification of explanation, the same reference numbers have been used in FIGS. 9-14 to indicate the same structure. As discussed above, it may become desirable to transition the RFID tag 250 to the restored state if ownership of an item associated with the RFID tag 250 is transferred a second time (e.g., item returned).

To transition the RFID tag 250 to the restored state, a return coupler 266 can be releasably engaged with the substrate 258.

In the restored state, the return coupler 266 can electrically couple the antenna 256 to the RFID chip 254. In the RFID tag 250 illustrated, the return coupler 266 overlays a portion of the antenna 256 and a portion of the RFID chip 254 (e.g., a contact pad on the RFID chip 254). The return coupler 266, once releasably engaged with the substrate 258, restores the read range of the RFID tag 250 to about the read range in the engaged state.

The return coupler 266 can be composed of a conductive tape, pressure sensitive material or the return coupler 266 could be applied such as with a marker, pen, wax crayon or the like. In such a situation, an end-user employing the return coupler 266 can lay the conductive tape across the RFID transceiver 252. Alternatively, the return coupler 266 could be composed as a pre-formed pressure sensitive label or label system with a conductive adhesive. In some implementations, guidelines could be printed on the RFID transceiver to assist the end-user in applying the return coupler 266.

Figure 15:
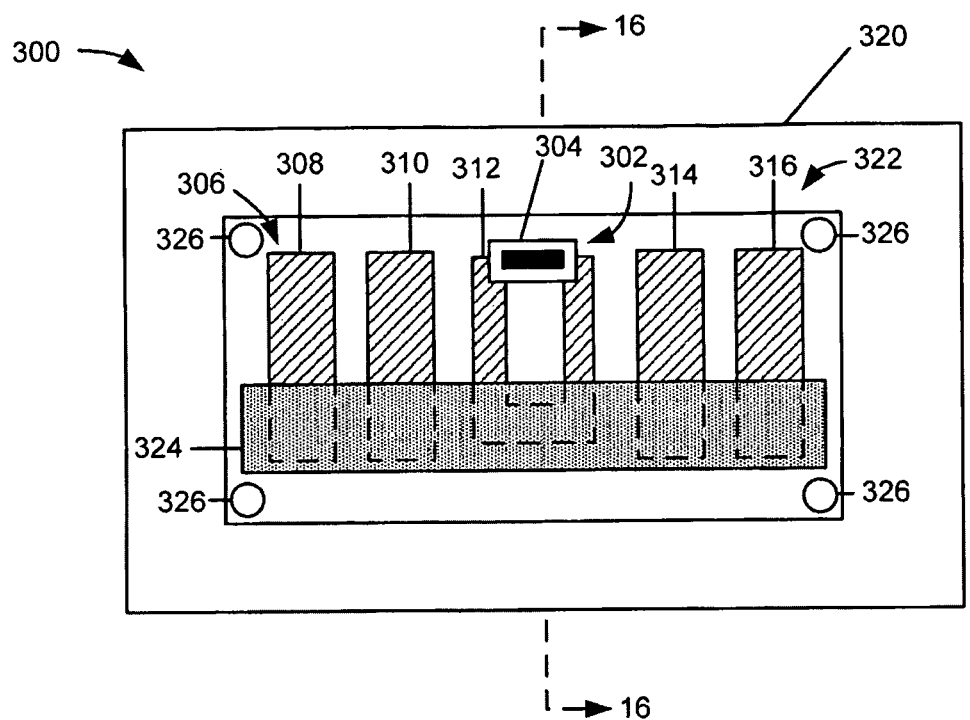
FIG. 15 illustrates another block diagram of an RFID tag according to an aspect of the invention.
Figure 16:
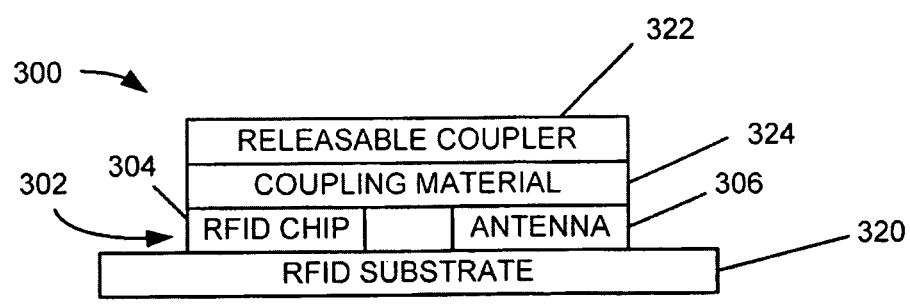
FIG. 16 illustrates a cross section of the RFID tag of FIG. 9 taken along line 16-16 thereof.

FIG. 15 illustrates still a further example of an RFID tag 300 in accordance with an aspect of the invention. The RFID tag 300 is illustrated in the engaged state. FIG. 16 illustrates a cross-sectional view of the RFID tag 300 illustrated in FIG. 3 taken along line 16-16 thereof. For purposes of simplification of explanation, the same reference numbers have been used in both FIGS. 15 and 16. The RFID tag 300 includes an RFID transceiver 302 with RFID chip 304 and an associated antenna 306. The associated antenna 306 includes a plurality of antenna segments 308-316 (e.g. discrete sections). In the present example, a single antenna segment 312 (of the plurality of antenna segments 308-316) is permanently electrically coupled to the RFID chip 304; although those skilled in the art will appreciate that more antenna segments 308-316 could be permanently electrically coupled to the RFID chip 304 as well. The RFID transceiver 302 can be mounted onto a substrate 320.

The RFID tag 300 also includes a releasable coupler 322 that can be releasably engaged to the substrate 320 and/or the RFID transceiver 302. The releasable coupler 322 can include a section of coupling material 324 that can electrically couple the antenna segments 308-316 of the RFID transceiver 302 together. As one example, when the antenna segments 308-316 of the RFID transceiver 302 are electrically coupled together, the impedance of the antenna 306 is changed relative to the impedance of the RFID chip 304, thereby increasing the read range of the RFID tag 300. Additionally or alternatively, coupling the antenna segments 306-316 together could change the gain and/or directionality of the antenna 306.

In the present example, the releasable coupler 322 can be disengaged and re-engaged by an end user to transition the RFID tag 300 from an engaged state to a disengaged state and vice versa. To facilitate the disengaging and re-engaging, a locking mechanism can be employed. The locking mechanism can include, for example, a plurality of locking members 326 that need to be simultaneously engaged (e.g., using a specially designed tool) to engage or disengage the releasable coupler 322 with the substrate 320. The locking members 326 could be implemented, for example, as rivets, through holes, plastic and hook and loop type fasteners, frangible bonds, magnets, mechanical locks controlled by magnets, crimping of the substrate and coupler together, etc. One of ordinary skill will recognize the variety of locking mechanisms that could be implemented on the RFID tag 300.

Figure 17:
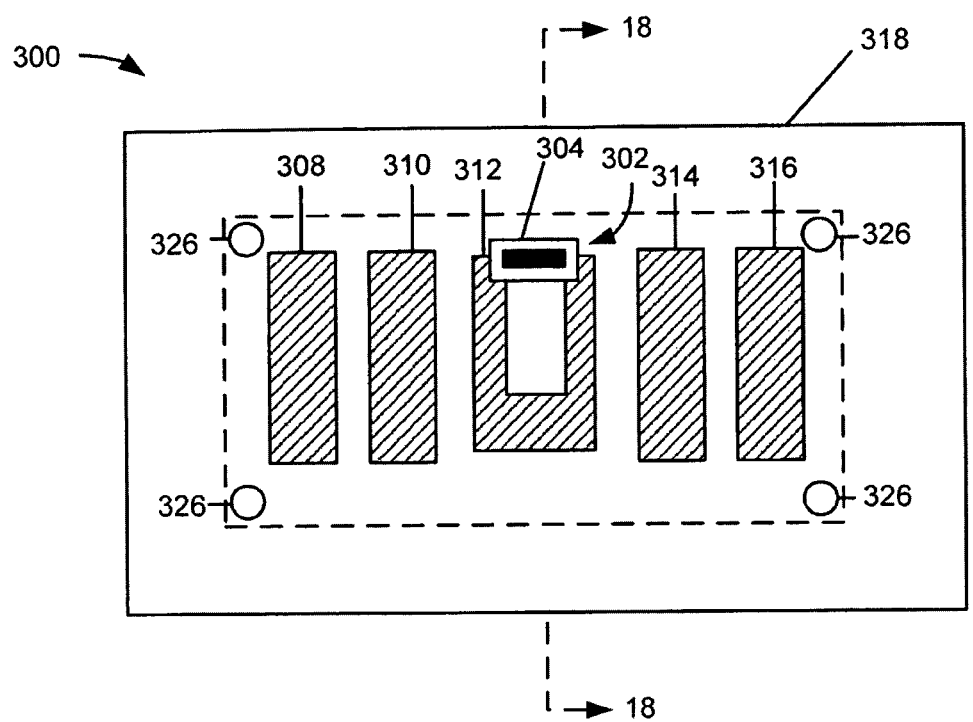
FIG. 17 illustrates a block diagram of the RFID tag illustrated in FIG. 15 according to an aspect of the invention.
Figure 18:
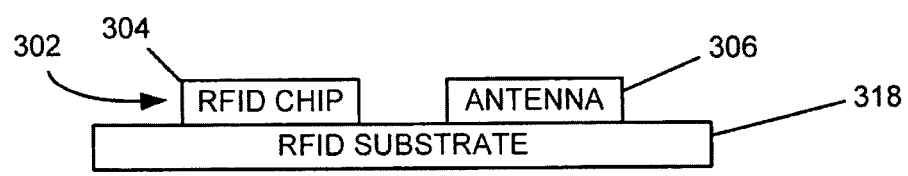
FIG. 18 illustrates a cross section of the RFID tag of FIG. 17 taken along line 18-18 thereof.

FIG. 17 illustrates the RFID tag 300 illustrated in FIGS. 15 and 16 in the disengaged state. FIG. 18 illustrates a cross-sectional view of the RFID tag 300 illustrated in FIG. 17 taken along line 18-18 thereof. For purposes of simplification of explanation, the same reference numbers have been used in FIGS. 15-18 to indicate the same structure. As discussed above, it may become desirable to transition the RFID tag 300 to the disengaged state if ownership of an item associated with the RFID tag 300 is transferred (e.g., item purchased). In the disengaged state, the section of coupling material 324 (removed, and thus not shown) does not contact the antenna segments 308-316 together. Accordingly, in the disengaged state, only one of the antenna segments 312 is coupled to the RFID chip 304, thereby substantially reducing the read range of the RFID tag 300. Typically, the reduced read range is desirable so that the RFID tag 300 cannot be interrogated by any reader system that is not in very close proximity to the RFID tag 300. As previously discussed, the releasable coupler 322 can be re-engaged to the substrate 320, thereby returning the RFID tag 300 to the engaged state.

Figure 19:
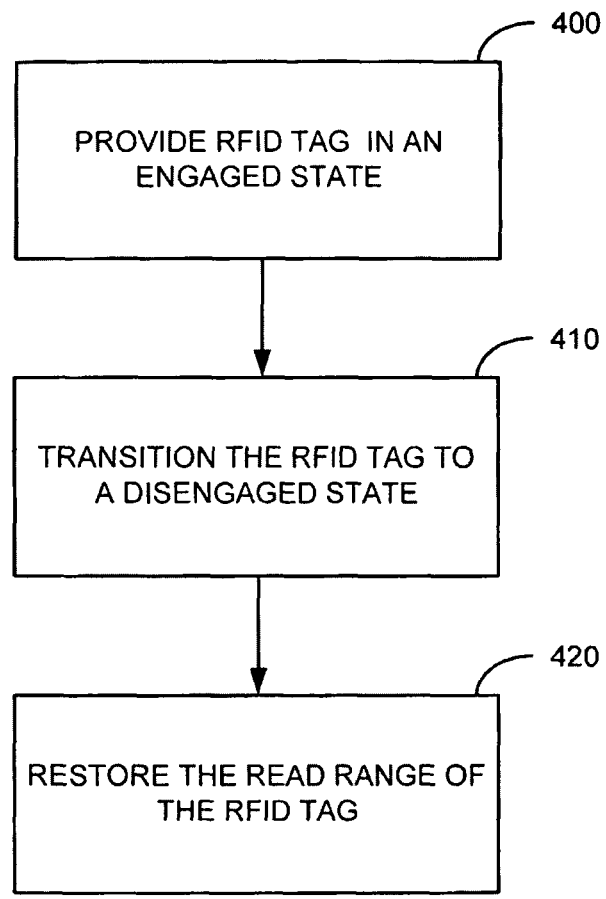
FIG. 19 illustrates a flow chart of a methodology for altering a read range of an RFID tag in accordance with an aspect of the invention.

In view of the foregoing structural and functional features described above, methodologies will be better appreciated with reference to FIG. 19. It is to be understood and appreciated that the illustrated actions, in other embodiments, may occur in different orders and/or concurrently with other actions. Moreover, not all illustrated features may be required to implement a method.

FIG. 19 illustrates an example of a methodology for altering a read range of an RFID tag in accordance with an aspect of the invention. At 400, an RFID tag is provided in an engaged state. The RFID tag can include, for example an RFID transceiver that includes an RFID chip and the antenna. The antenna could be formed, for example, with a plurality of antenna segments. The transceiver can be mounted on a substrate of the RFID tag. The RFID tag can also include a releasable coupler that can be releasably engaged with the substrate and/or the RFID transceiver, such that the RFID tag is provided in an engaged state. The releasable coupler can include a coupling material that can, for example, electrically couple the plurality of antenna segments together and/or to the RFID chip such that the RFID tag is provided with about a maximum read range. In some implementations, the releasable coupler can be secured to the substrate and/or the RFID transceiver with an adhesive (e.g., a non-curing pressure sensitive adhesive). In other implementations, the releasable coupler can be secured to the substrate and/or the RFID transceiver with a locking mechanism. At 410, the RFID tag is transitioned to a disengaged state. To transition the RFID tag to the disengaged state, the releasable coupler is disengaged from the substrate and/or the RFID transceiver, thereby substantially reducing the read range of the RFID tag.

At 420, the read range of the RFID tag is substantially restored. The read range of the RFID tag can be substantially restored, for example, by releasably engaging a return coupler (e.g., composed of conductive tape, pressure sensitive material, etc.) with the substrate and/or the RFID transceiver. The return coupler, when releasably engaged with the substrate and/or the RFID transceiver can, for example, electrically couple the plurality of antenna segments together, and/or electrically couple the plurality of antenna segments to the RFID chip. When the return coupler is releasably engaged with the substrate and/or the RFID transceiver, the read range of the RFID tag can be restored to about the maximum read range. In other implementations, the read range of the RFID tag can be substantially restored at 420 by releasably engaging the same or different releasable coupler to the substrate and/or the RFID transceiver, thereby transitioning the RFID tag back to the engaged state.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

What is claimed is:

1. A radio-frequency identification (RFID) tag comprising:
   an RFID transceiver configured to transmit and receive radio frequency (RF) signals, the RFID transceiver comprising an integrated circuit (IC) coupled to an antenna having a plurality of discrete antenna segments that are spaced apart from each other, and at least one of the plurality of discrete antenna segments is permanently electrically coupled to the IC chip, having an impedance, a gain and directionality that, in conjunction with the characteristics of the IC defines a first read range of the RFID tag and; and
   a removable, releasable coupler, configured to be releasably engagable with the RFID transceiver comprising a coupling material, the releasable coupler being configured such that when the releasable coupler is releasably engaged with the RFID transceiver, the coupling material altering at least one of the impedance, the gain and the directionality of the antenna to define a second read range of the RFID tag, wherein the second read range is greater than the first read range and when the releasable coupler is disengaged from the RFID transceiver the second read range is less than the first read range and when in a disengaged state, only one of the plurality of discrete antenna segments is electrically or physically coupled to the IC chip such that the releasable coupler comprises a releasable locking mechanism configured to releasably secure the releasable coupler to a substrate;
   wherein the releasable coupler comprises a layer of adhesive material that releasably secures the releasable coupler to the substrate; and
   textual indicia printed on the RFID tag under the releasable coupler so that when the releasable coupler is removed the indicia is revealed to indicate that the RFID tag is in a disengaged state.

2. The RFID tag of claim 1, further comprising a substrate on which the RFID transceiver and the releasable coupler are mounted.

3. The RFID tag of claim 1, further comprising a return coupler configured to be releasably engagable with a least a portion of the RFID transceiver, the return coupler being configured such that when the return coupler is releasably engaged with the RFID transceiver, the return coupler alters the impedance of the antenna to define a third read range of the RFID tag, wherein the third read range is greater than the first read range.

4. The RFID tag of claim 3, wherein the third read range is equal to the second read range.

5. A radio-frequency identification (RFID) tag comprising:
   an RFID transceiver configured to transmit and receive radio frequency (RF) signals, the RFID transceiver comprising:
   an integrated circuit (IC) chip and;
   an antenna comprising a plurality of discrete segments, wherein the plurality of discrete segments are spaced apart from each other, and at least one of the plurality of discrete segments is permanently electrically coupled to the IC chip to provide a first read range for the RFID tag; and
   a removable, releasable coupler, configured to be releasably engagable with the RFID transceiver comprising a coupling material, the releasable coupler being configured such that when the releasable coupler is releasably engaged with the RFID transceiver, the coupling material couples at least two of the plurality of discrete antenna segments together to provide a second read range for the RFID tag, wherein the second read range is greater than the first read range and when the releasable coupler is disengaged from the RFID transceiver the second read range is less than the first read range and when in a disengaged state, only one of the plurality of discrete antenna segments is electrically or physically coupled to the IC chip such that the releasable coupler comprises a releasable locking mechanism configured to releasably secure the releasable coupler to a substrate;
   wherein the releasable coupler comprises a layer of adhesive material that releasably secures the releasable coupler to the substrate; and
   textual indicia printed on the RFID tag under the releasable coupler so that when the releasable coupler is removed the indicia is revealed to indicate that the RFID tag is in a disengaged state.

6. The RFID tag of claim 5, wherein the coupling material comprises a conductive material.

7. The RFID tag of claim 5, wherein the first read range is less than 300 centimeters.

8. The RFID tag of claim 7, wherein the second read range is at least 8 meters.

9. The RFID tag of claim 5, the RFID tag further comprising a substrate, wherein the RFID transceiver and a removable strip are mounted on the substrate.

10. The RFID tag of claim 5 further comprising a return coupler configured to be releasably engagable with the substrate, the return coupler being configured such that when the return coupler is releasably engaged with the substrate, the return coupler couples at least two of the plurality of discrete antenna segments together to provide a third read range for the RFID tag, wherein the third read range is greater than the first read range.

11. The RFID tag of claim 10, wherein the third read range is equal to the second read range.

12. A method for altering a read range of a radio frequency identification (RFID) tag comprising:
   providing the RFID tag in an engaged state that comprises:
   an RFID transceiver that can provide radio frequency (RF) signals in response to interrogation signals; and
   a removable, releasable coupler, engaged with the RFID transceiver to define a first read range for the RFID tag, the RFID tag having a plurality of discrete antenna segments that are spaced apart from each other, and at least one of the plurality of discrete antenna segments is permanently electrically coupled to the IC chip wherein the releasable coupler comprises a releasable locking mechanism configured to releasably secure the releasable coupler to a substrate,
   transitioning the RFID tag to a disengaged state with a second read range that is less than the first read range by disengaging the releasable coupler from the RFID transceiver and when in a disengaged state, only one of the plurality of discrete antenna segments is electrically or physically coupled to the IC chip;
   wherein the releasable coupler is secured to the RFID transceiver via an adhesive material; and
   textual indicia printed on the RFID tag under the releasable coupler so that when the releasable coupler is removed the indicia is revealed to indicate that the RFID tag is in a disengaged state.

13. The method of claim 12, further comprising restoring the read range of RFID tag to the first read range.

14. The method of claim 13, wherein the restoring of the read range of the RFID tag to the first read range comprises releasably engaging the RFID tag with a return coupler.

15. The method of claim 13, wherein the releasable coupler is secured to the RFID transceiver via a releasable locking mechanism, and wherein the restoring of the read range of the RFID tag to the first read range comprises reengaging the releasable coupler to the RFID tag.

16. The method of claim 13, wherein the releasable coupler is a first releasable coupler that is releasably engaged to the RFID transceiver via a releasable locking mechanism and the restoring of the read range of the RF tag to the first read range comprises releasably engaging a second releasable coupler to the RFID tag via the releasable locking mechanism.

17. A radio-frequency identification (RFID) tag comprising:
an RFID transceiver including an integrated circuit configured to transmit and receive radio frequency (RF) signals, the RFID transceiver comprising an integrated circuit (IC) coupled to an antenna having a plurality of discrete antenna segments that are spaced apart from each other, and at least one of the plurality of discrete antenna segments is permanently electrically coupled to the integrated circuit, having one or more of an impedance, gain or directionality that defines a first read range of the RFID tag; and
a removable, releasable coupler, configured to be releasably engagable with the RFID transceiver comprising a coupling material, the releasable coupler being configured such that when the releasable coupler is releasably engaged with the RFID transceiver, the coupling material altering at least one of the impedance, gain and directionality of the RFID tag by coupling at least one spaced apart discrete antenna segment to at least one of the plurality of discrete antenna segments permanently electrically coupled to the integrated circuit in order to define a second read range of the RFID tag, wherein the second read range is greater than the first read range and when the releasable coupler is disengaged from the RFID transceiver the second read range is less than the first read range and when in a disengaged state, only one of the plurality of discrete antenna segments is electrically or physically coupled to the IC chip such that the releasable coupler comprises a releasable locking mechanism configured to releasably secure the releasable coupler to a substrate;
wherein the releasable coupler comprises a layer of adhesive material that releasably secures the releasable coupler to the substrate; and
textual indicia printed on the RFID tag under the releasable coupler so that when the releasable coupler is removed the indicia is revealed to indicate that the RFID tag is in the disengaged state.

18. A radio frequency identification (RFID) tag, comprising;
an RFID transceiver including an integrated circuit (IC) coupled to an antenna having a plurality of discrete antenna segments that are spaced apart from each other, and at least one of the plurality of discrete antenna segments is permanently electrically coupled to the integrated circuit;
a releasable coupler configured to be releasably engaged with the RFID transceiver having a read range and when the releasable coupler is disengaged from the RFID transceiver the read range is reduced and when in a disengaged state, only one of the plurality of antenna segments is electrically or physically coupled to the IC chip;
the removable, releasable coupler, comprising a coupling material and one or more separable discrete sections which when removed from the RFID transceiver alters the read range and the releasable coupler comprises a releasable locking mechanism configured to releasably secure the releasable coupler to a substrate wherein the locking mechanism includes a plurality of locking members that need to be simultaneously engaged; and
textual indicia printed on the RFID tag under the releasable coupler so that when the releasable coupler is removed the indicia is revealed to indicate that the RFID tag is in a disengaged state.

19. The RFID tag of claim 1, wherein the removable, releasable coupler further comprises perforations, slits, score lines, or a pull tab.

20. The RFID tag of claim 17, further comprising a return coupler configured to be releasably engagable with at least a portion of the RFID transceiver, the return coupler being configured such that when the return coupler is releasably engaged with the RFID transceiver, the return coupler coupling a plurality of spaced apart antenna segments to at least one of the plurality of antenna segments permanently electrically coupled to the integrated circuit.

21. The RFID tag of claim 1, wherein the releasable coupler further comprises a layer of printed indicia.

\* \* \* \* \*